(12) United States Patent
Lin

(10) Patent No.: US 10,297,029 B2
(45) Date of Patent: May 21, 2019

(54) METHOD AND DEVICE FOR IMAGE SEGMENTATION

(71) Applicant: ALIBABA GROUP HOLDING LIMITED, George Town, Grand Cayman (KY)

(72) Inventor: Hailue Lin, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 195 days.

(21) Appl. No.: 15/582,186

(22) Filed: Apr. 28, 2017

(65) Prior Publication Data

US 2017/0236292 A1    Aug. 17, 2017

Related U.S. Application Data

(63) Continuation of application No. PCT/CN2015/092509, filed on Oct. 22, 2015.

(30) Foreign Application Priority Data

Oct. 29, 2014   (CN) .......................... 2014 1 0597626

(51) Int. Cl.
  *G06T 7/194*   (2017.01)
  *G06K 9/46*    (2006.01)
  *G06T 7/162*   (2017.01)

(52) U.S. Cl.
  CPC ........... *G06T 7/194* (2017.01); *G06K 9/4628* (2013.01); *G06T 7/162* (2017.01);
  (Continued)

(58) Field of Classification Search
  None
  See application file for complete search history.

(56) References Cited

U.S. PATENT DOCUMENTS 5,604,820 A * 2/1997 Ono .................. G06K 9/00268
                                                     382/157
6,728,404 B1 * 4/2004 Ono .................... G06K 9/3241
                                                     382/118
(Continued)

FOREIGN PATENT DOCUMENTS

CN        101847264 A       9/2010
CN        101950400 A       1/2011
(Continued)

OTHER PUBLICATIONS

First Chinese Search Report dated Jun. 19, 2018, issued by the State Intellectual Property Office of the People's Republic of China in counterpart Chinese Patent Application No. 201410597626.5 (1 page).

(Continued)

*Primary Examiner* — Ryan P Potts
(74) *Attorney, Agent, or Firm* — Finnegan, Henderson, Farabow, Garrett & Dunner, LLP

(57) ABSTRACT

A system and method involving performing image classification on the image according to a position of a subject in the image; selecting, from a plurality of subject position templates, a subject position template for the image according to a result of the image classification, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and performing image segmentation according to the weight distribution field in the selected subject position template to segment the subject from the image.

19 Claims, 15 Drawing Sheets

(52) U.S. Cl.
CPC ............... *G06T 2207/20076* (2013.01); *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 6,778,698 B1 | 8/2004 | Prakash et al. | |
| 6,973,213 B2 | 12/2005 | Fan et al. | |
| 7,676,081 B2 | 3/2010 | Blake et al. | |
| 2003/0108237 A1 | 6/2003 | Hirata | |
| 2005/0275897 A1* | 12/2005 | Fan | G06K 9/00456 358/2.1 |
| 2006/0056689 A1 | 3/2006 | Wittebrood et al. | |
| 2006/0159342 A1 | 7/2006 | Sun et al. | |
| 2007/0140571 A1 | 6/2007 | Fan et al. | |
| 2008/0144943 A1* | 6/2008 | Gokturk | G06F 17/3025 382/224 |
| 2008/0267497 A1 | 10/2008 | Fan | |
| 2009/0129671 A1 | 5/2009 | Hu et al. | |
| 2010/0111370 A1* | 5/2010 | Black | G06K 9/00369 382/111 |
| 2010/0183225 A1 | 7/2010 | Vantaram et al. | |
| 2011/0096183 A1* | 4/2011 | Robertson | H04N 5/275 348/222.1 |
| 2012/0093402 A1* | 4/2012 | Staelin | G06K 9/4671 382/165 |
| 2013/0064460 A1* | 3/2013 | Zhang | G06K 9/00677 382/225 |
| 2013/0259374 A1* | 10/2013 | He | G06K 9/34 382/173 |
| 2013/0279816 A1* | 10/2013 | Zhang | G06K 9/00234 382/225 |
| 2014/0086483 A1 | 3/2014 | Zhang et al. | |

FOREIGN PATENT DOCUMENTS

| | | |
|---|---|---|
| CN | 102779270 A | 11/2012 |
| CN | 102842135 A | 12/2012 |
| CN | 103577475 A | 2/2014 |
| CN | 103578098 A | 2/2014 |
| EP | 1-918-872 A2 | 5/2008 |
| KR | 20060007901 A | 1/2006 |
| WO | WO 00/77735 A1 | 12/2000 |
| WO | WO 2016/066042 A1 | 5/2016 |

OTHER PUBLICATIONS

First Office Action dated Jun. 28, 2018, issued by the State Intellectual Property Office of the People's Republic of China in counterpart Chinese Patent Application No. 201410597626.5 (7 pages).

PCT International Search Report and Written Opinion dated Jan. 15, 2016, issued in corresponding International Application No. PCT/CN2015/092509 (13 pages).

* cited by examiner

Candy Color Cropped Jeans (13 Colors)

1100

1200

1300

1400

METHOD AND DEVICE FOR IMAGE SEGMENTATION

CROSS-REFERENCE TO RELATED APPLICATIONS

This application is a national stage of International Application No. PCT/CN2015/092509, filed Oct. 22, 2015, which is based on and claims priority from Chinese Patent Application No. 201410597626.5, filed Oct. 29, 2014, the entire contents of all of which are incorporated herein by reference.

TECHNICAL FIELD

The present invention relates to the field of image processing and, in particular, to an image segmentation method and device.

BACKGROUND

With the rapid development of technology, for use in the business services such as item search and item selection, items often need to be segmented from images containing the items. Current image segmentation techniques include, for example, segmentation techniques based on significant region detection, segmentation techniques based on face detection, segmentation techniques based on image connectivity, or the like. However, none of these segmentation techniques is applicable for the segmentation of garment images. The segmentation technique based on significant region detection has a good segmentation effect when the image has a clear background and a simple layout, but many images containing commercial items have a complex background or a complex layout. The segmentation technique based on face detection is suitable for images where there is a fashion model and the fashion model has a clear face and a simple posture, but many images containing commercial items do not have any fashion model or the fashion model has a complex posture. The segmentation technique based on image connectivity is suitable for situations where the image has a clear background and a simple layout and the garment itself has little texture, but many images containing commercial items have a complex background or a complex layout. It can be seen therefrom that it is difficult for these segmentation methods to achieve satisfactory effects of image segmentation.

SUMMARY

The present disclosure provides a method for segmenting an image. Consistent with some embodiments, the method includes performing image classification on the image according to a position of a subject in the image; selecting, from a plurality of subject position templates, a subject position template for the image according to a result of the image classification, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and performing image segmentation according to the weight distribution field in the selected subject position template to segment the subject from the image.

Consistent with some embodiments, this disclosure provides a device for segmenting an image. The device includes a classification unit used for, according to a position of a subject in the image, performing image classification on the image; a weight configuration unit used for selecting, from a plurality of subject position templates, a subject position template for the image according to a result of the image classification from the classification unit, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and a segmentation unit used for performing image segmentation according to the weight distribution field in the selected subject position template to segment the subject from the image.

Consistent with some embodiments, this disclosure provides a non-transitory computer readable medium that stores a set of instructions that are executable by at least one processor of a device to cause the device to perform a method for segmenting an image. The method includes performing image classification on the image according to a position of a subject in the image; selecting, from a plurality of subject position templates, a subject position template for the image according to a result of the image classification, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and performing image segmentation according to the weight distribution field in the selected subject position template to segment the subject from the image.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIGS. 5-9 are examples of clustering results, consistent with some embodiments of this disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
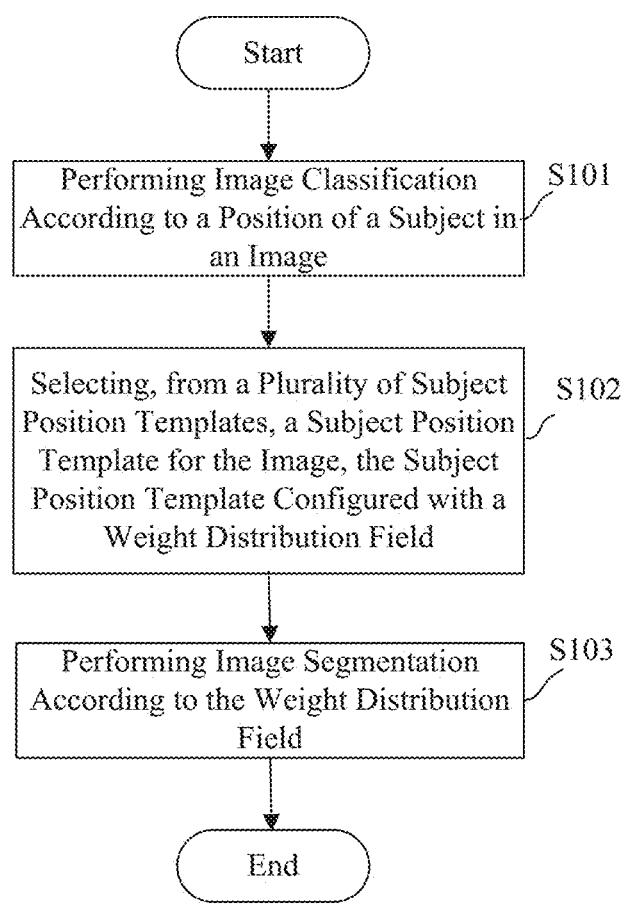
FIG. 1 is a flowchart of an exemplary method for segmenting an image, consistent with some embodiments of this disclosure.

FIG. 1 is a flowchart of an exemplary method 100 for segmenting an image, consistent with some embodiments of this disclosure. In the exemplary method 100, a subject is segmented from an image according to a result of image classification. The method 100 may be performed by a device for segmenting an image. Referring to FIG. 1, the method 100 includes the following steps.

In step S101, according to a position of a subject in an image, the device performs image classification on the image. For example, the image may include a commodity subject.

In step S102, according to a result of the image classification, the device selects, from a plurality of subject position templates, a subject position template of for the image. Each of the plurality of subject position templates is associated with a pre-defined position parameter, and each of the subject position templates is configured with a weight distribution field according to the pre-defined position parameter, the weight distribution field representing the probability that each pixel in the image belongs to a foreground or a background. The pre-defined position parameter in the subject position templates may be different from one another.

In step S103, the device performs image segmentation according to the weight distribution field in the selected subject position template, so as to segment a subject from the image.

In the method 100, an image is classified according to a subject position before image segmentation, and as a result, the segmentation result is improved.

In some embodiments, in step S101, the image classification is performed by means of a deep learning method. Other image classification methods can also be applied herein without limitation.

The deep learning method relates to an artificial neural network, which in particular refers to training a Convolutional Neural Network (CNN) to serve as an image classifier. It should be understood that, besides the convolutional neural network, other deep learning methods can also be used, e.g. the AutoEncoder, the Sparse Coding, the Restricted Boltzman Machine (RBM), the Deep Belief Network (DBN), and the like.

Figure 2:
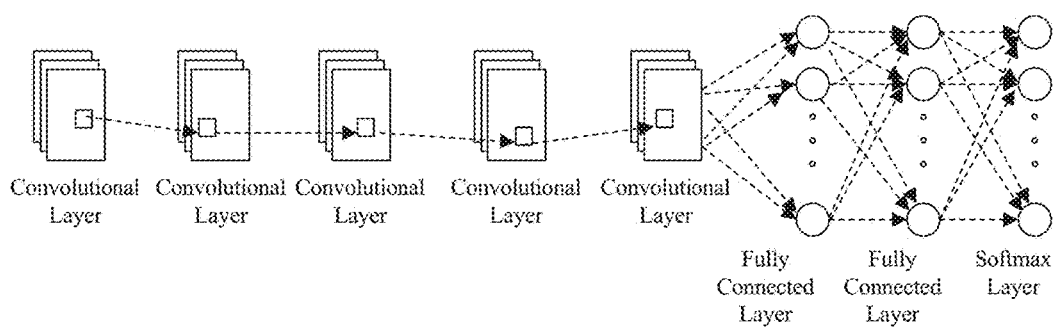
FIG. 2 is a schematic diagram of an exemplary Convolutional Neural Network (CNN), consistent with some embodiments of this disclosure.

FIG. 2 is a schematic diagram of an exemplary CNN 200, consistent with some embodiments of this disclosure. As shown in FIG. 2, the CNN 200 is a deep network and is an 8-layer structure including 5 convolutional layers, 2 fully connected layers, and 1 Softmax layer. It should be understood that the CNN can also be in another structure, for example, including a down sampling layer, or another number of convolutional layers, or the like.

Figure 3:
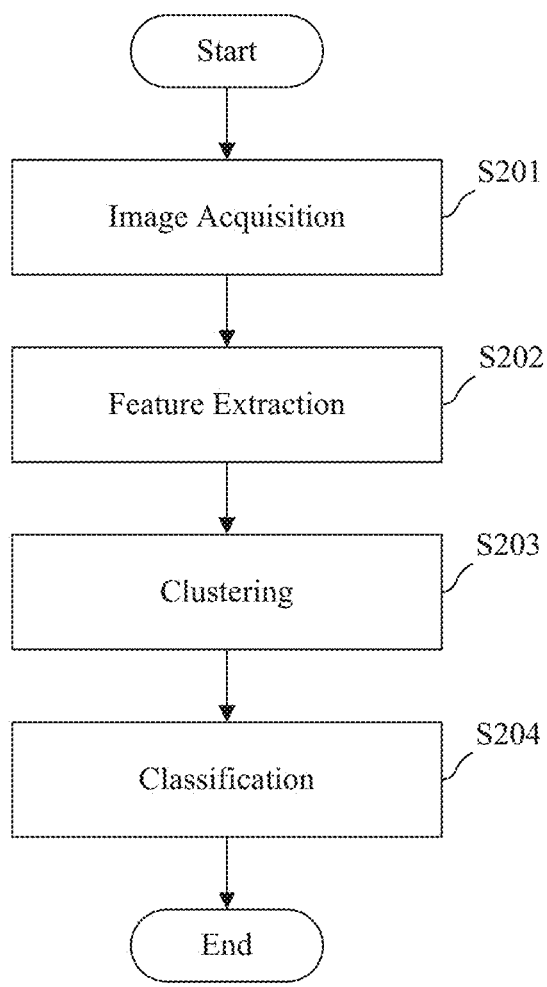
FIG. 3 is a flowchart of an exemplary process for constructing a training set, consistent with some embodiments of this disclosure.

FIG. 3 is a flowchart of an exemplary process 300 for constructing a training set, consistent with some embodiments of this disclosure. A training set is constructed in order to train a CNN. It should be understood that each step in the process 300 can be adjusted according to actual requirements, and the process for constructing a training set is not limited to the steps shown in FIG. 3. Referring to FIG. 3, the process 300 includes the following steps.

In step S201, the process acquires images. For example, the images may contain commodities.

In step S202, the process performs extraction of a plurality of features from the acquired images.

In step S203, the process performs clustering on the acquired images according to the extracted plurality of features, the number of clusters being A.

In step S204, according to the subject positions in the images, the process classifies images in some of the clusters into a same subject position class, and classifies images in the other clusters into various different subject position classes, the number of the subject position classes being B, where A and B are both integers, and $A > B \geq 2$.

For ease of understanding, an example of constructing a training set according to the above-mentioned steps is now given. In this example, the images contain a subject of garment. It should be appreciated that the present disclosure is not limited to this example and can also be used for other images.

For example, a crawler is used to download data under the category of women's dress on the Taobao platform, and the data is in the order of magnitude of one million bytes. The images are downloaded and standardized for subsequent processing, and the images are scaled to the same size, e.g., with a resolution of 256×256 pixels.

Figure 4:
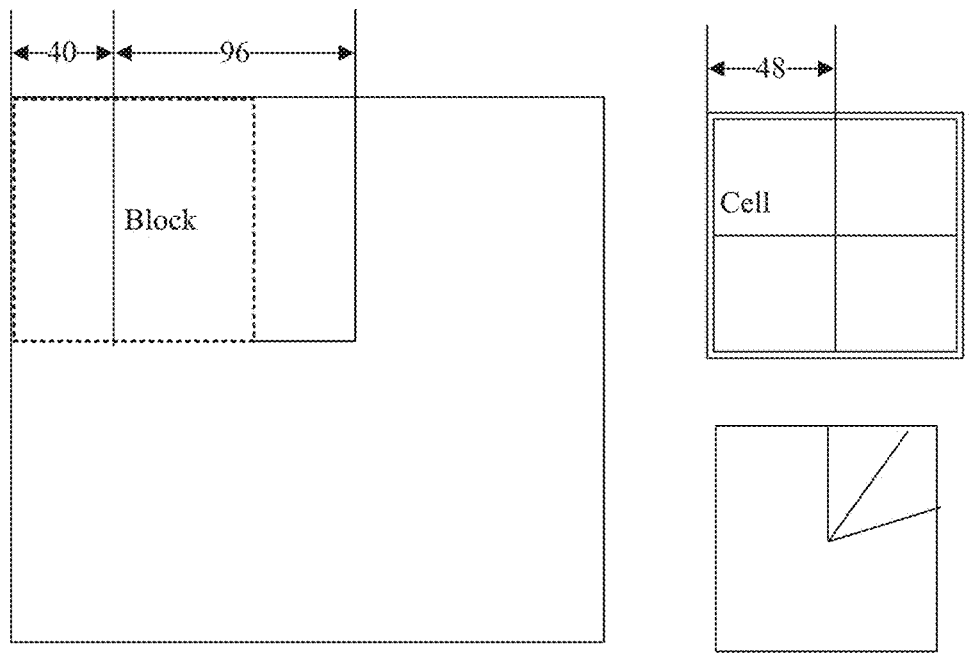
FIG. 4 is a schematic diagram of an exemplary method for HOG feature extraction, consistent with some embodiments of this disclosure.
Figure 5:
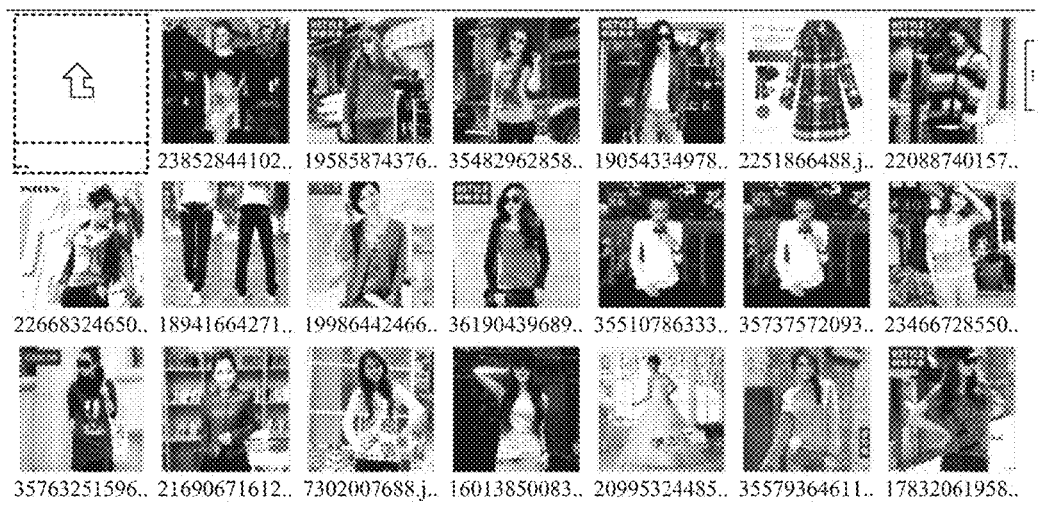
Figure 6:
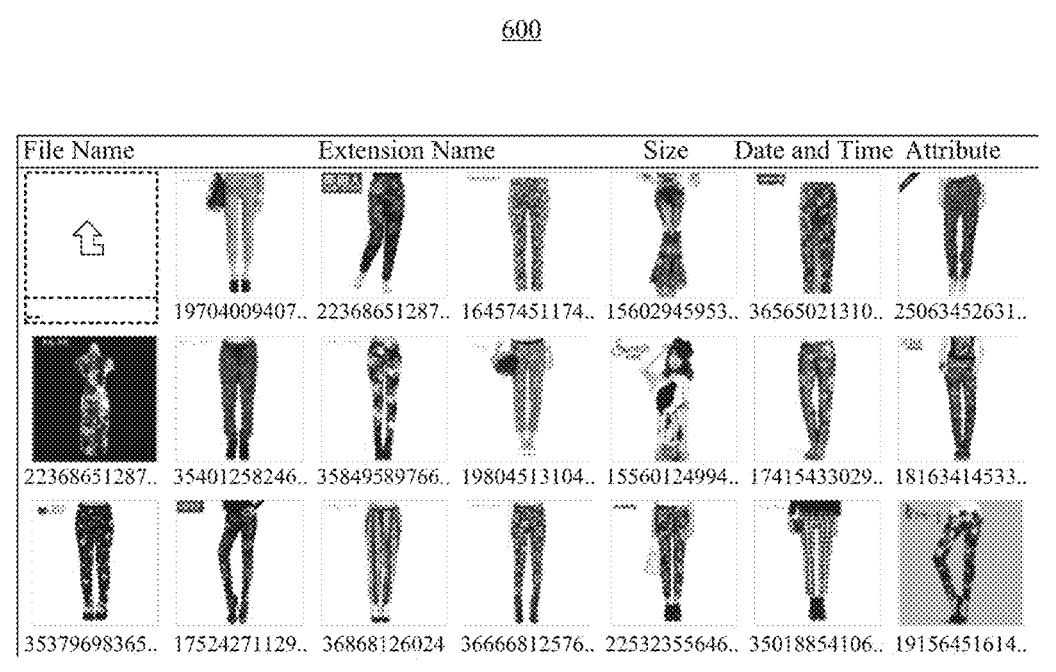
Figure 7:
Figure 8:
Figure 9:

Then two features are extracted from the data, i.e., a histogram of oriented gradient (HOG) feature and an image size feature. FIG. 4 is a schematic diagram of an exemplary method 400 for HOG feature extraction, consistent with some embodiments of this disclosure. As shown in FIG. 4, in the extraction of the HOG feature, the size of a block is set to 96×96 pixels, and the block slidingly traverses the entire image. The sliding distance of the block is set to 40 pixels, and each block is divided into 4 cells where the size of the cells is set to be 48×48 pixels. The direction number of each cell is set to be 9. In some embodiments, the extraction of a HOG feature includes converting an image into grayscale (e.g., converting the image into an x, y, z three-dimensional grayscale image), dividing the grayscale image into 4 small cells, calculating the gradient (i.e., orientation) of each pixel in each cell, and generating a histogram of gradient (the number of different gradients). In doing so, a HOG descriptor of each cell can be formed. The images are clustered according to the HOG features and size features of the images to form A clusters. For example, A is 512. FIGS. 5-9 are examples of images of clustering results 500-900, consistent with some embodiments of this disclosure.

Figure 10:
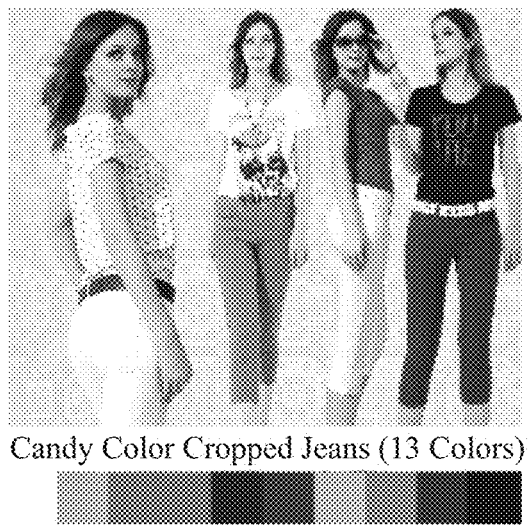
FIGS. 10-14 are examples of subject position classes, consistent with some embodiments of this disclosure.
Figure 11:
Figure 12:
Figure 13:
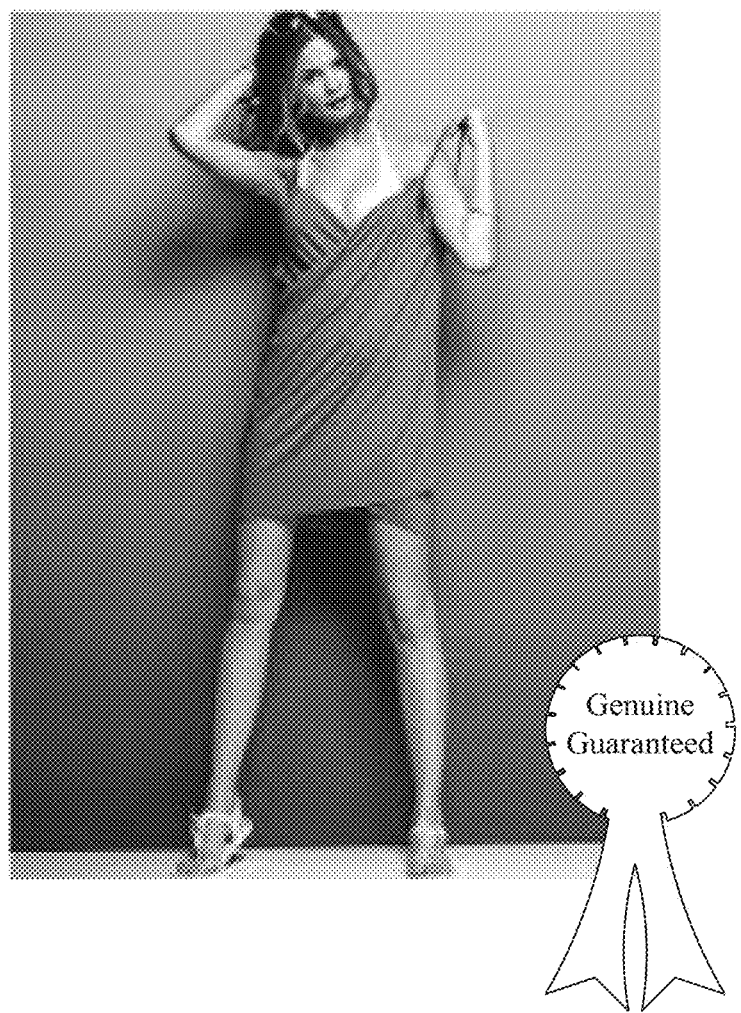
Figure 14:

The images are classified according to the clustering results. According to subject positions in the images, images in some of the clusters are classified into a same subject position class, which contains the majority of the images. Images in the other clusters are classified into various different subject position classes, which contain the minority of the images. The number of subject position classes is B. For example, B is 5, and the 5 classes are respectively: complex multi-column images, double-column images, single-column standard images, images narrower than single-column standard images, and images wider than single-column standard images. FIGS. 10-14 are examples of subject position classes 1000-1400, consistent with some embodiments of this disclosure. FIG. 10 is a class of complex multi-column image, FIG. 11 is a class of double-column image, FIG. 12 is a class of single-column standard image, FIG. 13 is a class of image narrower than a single-column standard image, and FIG. 14 is a class of image wider than a single-column standard image.

In this disclosure, A and B are both integers, and A>B≥2, and are not limited by the preceding numbers. Since in the process of constructing the training set, clustering is performed before classification, the accuracy of classification is improved when processing large amounts data, and the workload and costs are reduced.

Referring back to FIG. 1, in step S102, according to a result of the image classification, respective subject position templates are selected for the images. For example, there are 5 classes including: complex multi-column images, double-column images, single-column standard images, images narrower than single-column standard images, and images wider than single-column standard images. For complex multi-column images, no image segmentation is performed. For double-column images, single-column standard images, images narrower than single-column standard images, and images wider than single-column standard images, a subject position template is defined respectively, and the position parameter of each subject position template is different from one another.

In some embodiments, the weight distribution field is configured for the subject position template such that the closer to the center of the image, the probability of being a garment subject is greater (i.e., the weight is higher), and the farther from the center of the image, the probability of being a garment subject is smaller (i.e., the weight is lower). As the distribution of pixel points is based on the subject position, the segmentation effect is improved.

For example, for each pixel point p, the probability that the pixel belongs to a foreground, i.e., the probability that the pixel belongs to a subject, may be defined by the following formula:

$$forgroundLikelihood(p)=e^{-0.5d(p)^2},$$

where $d(p)$ is the distance measure of p to the center point of the image.

In some embodiments, position parameters a and b are introduced for different subject position templates so as to process different types of images. For example, $$d(p) = \sqrt{\left(\frac{p \cdot x - center \cdot x}{center \cdot x}\right)^2 / a^2 + \left(\frac{p \cdot y - center \cdot y}{center \cdot y}\right)^2 / b^2}$$

where center refers to the center point of the image, center.x and center.y represent the horizontal and vertical coordinates of the center point respectively, and p.x and p.y represent the horizontal and vertical coordinates of point p respectively.

For example, for a single-column standard image, it may be configured that a=0.3 and b=0.8. For an image narrower than a single-column standard image, it may be configured that a=0.2 and b=0.79. For an image wider than a single-column standard image, it may be configured that a=0.4 and b=0.81. For a double-column image, the left half of the image may be processed first as a single-column standard image.

Referring back to FIG. 1, in step S103, image segmentation is performed according to the weight distribution field in the selected subject position template, so as to segment a subject from the image. In some embodiments, the image may be segmented using Graph Cuts. It should be understood that other image segmentation methods, e.g. GrabCut, can also be used.

Detail description is now made to performing image segmentation with Graph Cuts. For example, for the image with a resolution of 256×256 pixels, an image having 256×256 cells is constructed, where each pixel point is an ordinary node, and each ordinary node is connected to four nodes on its up, down, left, and right side respectively via an edge. Each edge is associated with a weight, and the weight is configured depending on the similarity between pixel points.

Two virtual nodes are added to the image, one is a foreground node and the other is a background node. Each ordinary node is connected to the foreground node, and is also connected to the background node. The weight of a fore connecting line of the ordinary node connected to the foreground node and the weight of a back connecting line of the ordinary node connected to the background node are obtained according to the weight distribution field in step S102. That is, this weight distribution field represents the probability that each pixel in the image belongs to a foreground (i.e., a subject of the image) or a background. The image is divided into two parts according to the weight, and the part connected to the foreground node is the subject of the image.

Figure 15:
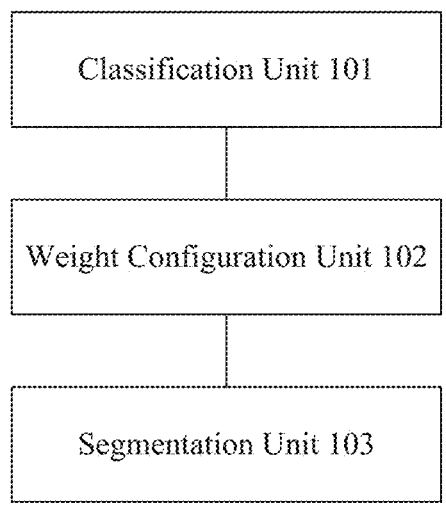
FIG. 15 is a block diagram of an exemplary device for segmenting an image, consistent with some embodiments of this disclosure.

FIG. 15 is a block diagram of an exemplary device 1500 for segmenting an image, consistent with some embodiments of this disclosure. For example, the device 1500 may segment a subject, such as a commodity, according to a result of image classification. Referring to FIG. 15, the device 1500 includes a classification unit 101, a weight configuration unit 102, and a segmentation unit 103.

The classification unit 101 is configured to, according to a position of a subject in an image, perform image on the images.

The weight configuration unit 102 is configured to, according to a result of the image classification from the classification unit, select, from a plurality of subject position templates, a subject position template for the image. Each of the plurality of subject position templates is associated with a pre-defined position parameter, and each of the subject position templates is configured with a weight distribution field according to the pre-defined position parameter, the weight distribution field representing the probability that each pixel in the image belongs to a foreground or a background. The pre-defined position parameter in the subject position templates may be different from one another.

The segmentation unit 103 is configured to perform image segmentation according to the weight distribution field in the selected subject position template, so as to segment a subject from the image.

In some embodiments, the segmentation device 1500 further comprises a training set construction unit 104 (not shown in FIG. 15) configured to construct a training set for training the classification unit 101.

In some embodiments, the segmentation device 1500 further comprises a weight distribution field configuration unit 105 (not shown in FIG. 15) for configuring the weight distribution field. In some embodiments, the closer to the center of the image, the higher the weight is configured for the pixel be a subject of the image, and the farther from the center of the image, the lower the weight is configured for the pixel to be a subject of the image.

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random Access Memory (RAM), an electrically erasable programmable read-only memory (EEPROM), Programmable Array Logic (PAL), a disk, an optical disc, a Digital Versatile Disc (DVD), and so on.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It should be understood by those skilled in the art that the above described units and modules can each be implemented through hardware, or software, or a combination of hardware and software for allowing a specialized device to perform the functions described above. If implemented by software, it may be stored in the above-described computer-readable medium. One of ordinary skill in the art will also understand that multiple ones of the above described units may be combined as one unit, and each of the above described units may be further divided into a plurality of subunits.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for segmenting an image, comprising:
    performing image classification on the image according to a position of a subject in the image;
    selecting, from a plurality of subject position templates, a subject position template for the image according to a result of the image classification, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and
    performing image segmentation according to the weight distribution field in the selected subject position template to segment the subject from the image.

2. The method of claim 1, wherein the image includes a garment as a subject of the image.

3. The method of claim 2, wherein the image classification is performed by using a deep learning method, and the deep learning method comprises a step of training a convolutional neural network to serve as an image classifier.

4. The method of claim 3, wherein the convolutional neural network comprises at least 5 convolutional layers, 2 fully connected layers, and 1 softmax layer.

5. The method of claim 3, wherein the convolutional neural network is trained based on a training set.

6. The method of claim 5, wherein constructing the training set comprises:
    acquiring a plurality of images;
    extracting a plurality of features from the plurality of images;
    performing clustering on the plurality of images into A clusters according to the extracted plurality of features; and
    according to subject positions in the plurality of images, classify images in one or more of the clusters classified into a same subject position class of B subject position classes, and classify images in other clusters into one or more different subject position classes of B subject position classes, wherein A and B are both integers, and $A > B \geq 2$.

7. The method of claim 6, wherein the plurality of features comprise a histogram of oriented gradient feature and a size feature.

8. The method of claim 1, wherein the weight distribution field is configured such that the closer a pixel is to a center of the image, the higher the weight is configured for the pixel to be the subject, and the farther the pixel is from the center of the image, the lower the weight is configured for the pixel to be the subject.

9. A device for segmenting an image, comprising:
    a memory storing a set of instructions; and
    a processor configured to execute the set of instructions to cause the device to perform:
        performing image classification on the image according to a position of a subject in the image;
        selecting, from a plurality of subject position templates, a subject position template for the image according to a result of the image classification, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and
        image segmentation according to the weight distribution field in the selected subject position template to segment the subject from the image.

10. The device of claim 9, wherein the processor is configured to execute the set of instructions to cause the device to further perform constructing a training set for the image classification.

11. The device of claim 9, wherein the processor is configured to execute the set of instructions to cause the device to further perform:
    configuring the weight distribution field, wherein the closer a pixel is to a center of the image, the higher the weight is configured for the pixel to be the subject, and the farther the pixel is from the center of the image, the lower the weight is configured for the pixel to be the subject.

12. A non-transitory computer readable medium that stores a set of instructions that is executable by at least one processor of a device to cause the device to perform a method for segmenting an image, the method comprising:

performing image classification on the image according to a position of a subject in the image;

selecting, from a plurality of subject position templates, a subject position template for the image according to a result of the image classification, wherein each of the plurality of subject position templates is associated with a pre-defined position parameter, and each of the plurality of subject position templates is configured with a weight distribution field according to the pre-defined position parameter, the weight distribution field representing a probability that each pixel in the image belongs to a foreground or a background; and performing image segmentation according to the weight distribution field in the selected subject position template to segment the subject from the image.

13. The non-transitory computer readable medium of claim 12, wherein the image includes a garment as a subject of the image.

14. The non-transitory computer readable medium of claim 13, wherein the image classification is performed by using a deep learning method, and the deep learning method comprises a step of training a convolutional neural network to serve as an image classifier.

15. The non-transitory computer readable medium of claim 14, wherein the convolutional neural network comprises at least 5 convolutional layers, 2 fully connected layers, and 1 softmax layer.

16. The non-transitory computer readable medium of claim 14, wherein the convolutional neural network is trained based on a training set.

17. The non-transitory computer readable medium of claim 16, wherein the set of instructions that is executable by the at least one processor of the device to cause the device to further perform:

acquiring a plurality of images;

extracting a plurality of features from the plurality of images;

performing clustering on the plurality of images into A clusters according to the extracted plurality of features; and according to subject positions in the plurality of images, classify images in one or more of the clusters classified into a same subject position class of B subject position classes, and classify images in other clusters into one or more different subject position classes of B subject position classes, wherein A and B are both integers, and A>B≥2.

18. The non-transitory computer readable medium of claim 17, wherein the plurality of features comprise a histogram of oriented gradient feature and a size feature.

19. The non-transitory computer readable medium of claim 12, wherein the weight distribution field is configured such that the closer a pixel is to a center of the image, the higher the weight is configured for the pixel to be the subject, and the farther the pixel is from the center of the image, the lower the weight is configured for the pixel to be the subject.

* * * * *

UNITED STATES PATENT AND TRADEMARK OFFICE
CERTIFICATE OF CORRECTION

PATENT NO. : 10,297,029 B2  
APPLICATION NO. : 15/582186  
DATED : May 21, 2019  
INVENTOR(S) : Hailue Lin Page 1 of 1

It is certified that error appears in the above-identified patent and that said Letters Patent is hereby corrected as shown below:

On the Title Page

Item (30), "2014 1 0597626" should read as --201410597626.5--

Signed and Sealed this  
Seventeenth Day of September, 2019

Andrei Iancu  
*Director of the United States Patent and Trademark Office*